Jan. 2, 1951     H. ENGELHARDT ET AL     2,536,493
MAXIMUM TEMPERATURE REGISTERING THERMOMETER
Filed July 26, 1944     2 Sheets-Sheet 1

INVENTORS
HUGO ENGELHARDT
EDWARD COLLINS, 3RD
BY THEIR ATTORNEYS
Barr, Borden & Fox Patented Jan. 2, 1951

2,536,493

UNITED STATES PATENT OFFICE 2,536,493

MAXIMUM TEMPERATURE REGISTERING THERMOMETER

Hugo Engelhardt, Philadelphia, Pa., and Edward Collins, III, Woodcrest, N. J., assignors to The Philadelphia Thermometer Company, Philadelphia, Pa., a partnership composed of J. Leonard Schwartz and Hugo Engelhardt Application July 26, 1944, Serial No. 546,690

8 Claims. (Cl. 73—371)

This invention relates to thermometers, pertaining particularly to maximum temperature registering thermometers.

There are many situations where moderately high temperatures must be noted or registered, which are too high for normal thermometers and have necessitated the use of more or less elaborate electrical and similar devices for registering purposes. Obviously, the expense and trouble involved in the latter procedure is high compared to a proper thermometer if one were provided that functioned efficiently, and it is therefore highly desirable that, if possible, a thermometer be provided for the purpose. Although many efforts have been made in the past to secure this highly desirable result of a high temperature registering thermometer, so far as known up to the present none have been successful. It is believed that there are two main effective difficulties. One factor is that with a conventional mercury thermometer working with the mercury in the capillary under a vacuum, the mercury boils at a comparatively low temperature and in its more or less volatilized or vaporized state prevents accurate readings. The other difficulty lies in the fact that with an overflow type of thermometer with the expanding mercury leaving a "spout" and passing into a reservoir, even into a reservoir containing gas under pressure sufficient to preclude boiling or vaporizing of the mercury at the maximum temperatures to which thermometer is exposed, there has always been heretofore the practical certainty of the retention of a small residual drop or globule of mercury in or so closely adjacent to the nozzle of the overflow spout as to be drawn back into the capillary tube of the thermometer stem as the temperature of the thermometer falls and the mercury contracts or shrinks. It is possible, if not probable, that the existence of such small globules of retained mercury after its theoretically complete expulsion from the capillary is really a function of the surface tension of the mercury causing a given small volume of mercury to assume a globular shape which adheres to the mouth of the spout. These two facts, either individually or collectively, have interfered with accuracy of the readings to a degree rendering such thermometers unusable for really accurate and critical work at actually high temperatures.

It is among the objects of this invention: to simplify the construction of maximum temperature registering thermometers; to provide a mercury thermometer comprising a high maximum registering thermometer of accuracy and simplicity of operation; to improve the art of thermometers generally; to provide a gas-trap bypass in the bore of a thermometer in which a column of mercury can pass behind a globule of entrapped gas to form a solid column for reading purposes; to provide an overflow thermometer with a constriction for the bore outlet such that an actual positive pressure is necessary to cause either overflow or inflow, and in which the mercury when extruded is both propelled with actual force and velocity so as to leave the vicinity of the mouth of the spout and is also practically atomized so as to provide such minute globules that their existence near to the mouth of the bore will not be dangerous nor disturb the readings; to provide a spout for a capillary tube having a mouth partially blocked by a curved surface substantially tangentially of a plane normal to the capillary tube so as to effect a sharp constriction in the capillary such as to divert the course of mercury extruded from the capillary and to discharge it past the curved surface at an angle widely divergent from the axis of the capillary tube; to provide a registering thermometer which can stand high temperatures without having the expansion of the tube itself disturb the accuracy of the thermometer as in earlier devices; to correct the deficiencies of prior maximum temperature registering thermometers; to provide methods of calibrating and reading maximum tempertaure registering thermometers. Other objects and advantages will become more apparent as the description proceeds.

In the accompanying drawings forming part of this description:

Figure 1:
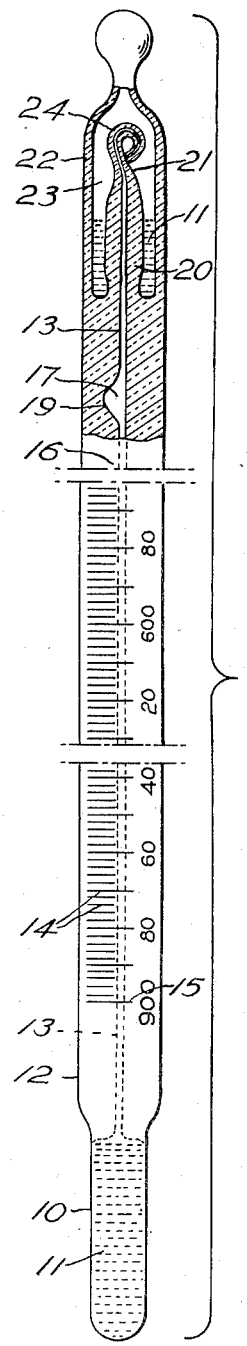
Fig. 1 represents a fragmentary side elevation, partially in section, of the preferred form of the invention.
Figure 2:
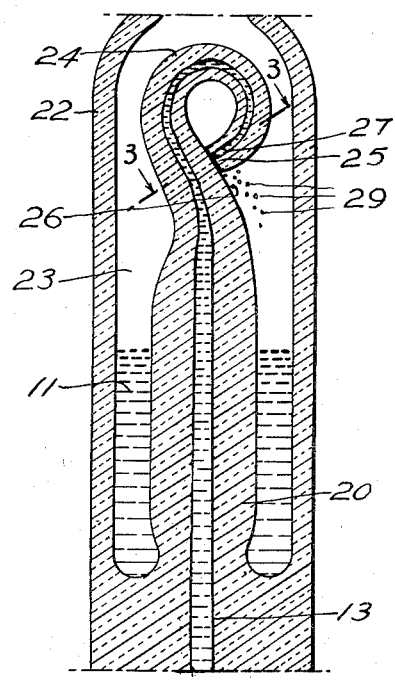
Fig. 2 represents a fragmentary enlarged section of the overflow and reservoir structure.

Referring now to Fig. 1, there is disclosed a mercury bulb 10 normally filled with mercury 11, and integral with the capillary tube 12 having the substantial concentric capillary bore 13 disposed internally, and externally bearing the graduations 14. For the express purposes of a high maximum registering thermometer it will be preferred that the graduations on one side of the tube at least start with the maximum temperature, say, illustratively, 900° F. at a point 15, adjacent to the bulb 10, while the outer end of the tube has a final minimum graduation, say, illustratively, at a point 16, representing, illustratively, 300° F.

The outer end of the tube 12 contains a lateral asymmetrical thin enlargement of the bore 13, as shown at 17, merging into and communicating laterally with the prolonged continuation of the capillary bore 13, preferably inwardly of and below the mergence of the bore 13 into the lower portion 20 of the spout 21 to be described. The spout 21 is spaced inwardly from the integral enclosing sealed housing 22, forming with the spout the reservoir 23.

In the preferred form the spout 21 is continued in a reduced attenuated reentrantly curved spout or mouth 24, the actual tip end of which 25 is brought into practically tight abutting engagement with the more or less rounded surface 26 of the spout 21 at a substantial tangent thereto. It will be seen that owing to the relations of the tip end 25 to the rounded surface 26, there will actually be at least one extremely thin but broad passage 18 formed between the extreme end 27 of the attenuated bore 13, and the rounded surface 26, which is preferably of appreciably smaller area or diameter than the bore itself. This minute passage 18 may be on one side or the other or both sides of the intersection of mouth 27 and rounded surface 26 and is so small that when, through expansion, the mercury column in the bore 13 reaches the end 27 thereof, egress of mercury is restricted to such a degree that it is actually deformed and its course is diverted and it is sprayed or emitted in a series of extremely small particles or minute globules of mercury 29, and the particles are sprayed out with velocity such as to cause them either to drop into the reservoir 23 to join the body of mercury 11 already therein, or at least be moved far enough from mouth 18 as not to be drawn into this opening and into the end 27 of the capillary bore 13 when the mercury shrinks or contracts in the latter. It is important to note that even a small change of volume of mercury such as would normally exude one large globule which would tend to hang in the mouth 27, when forced through the smaller constricted passage is given a velocity forcing the particles, into which it is broken, away from the mouth 27.

Figure 6:
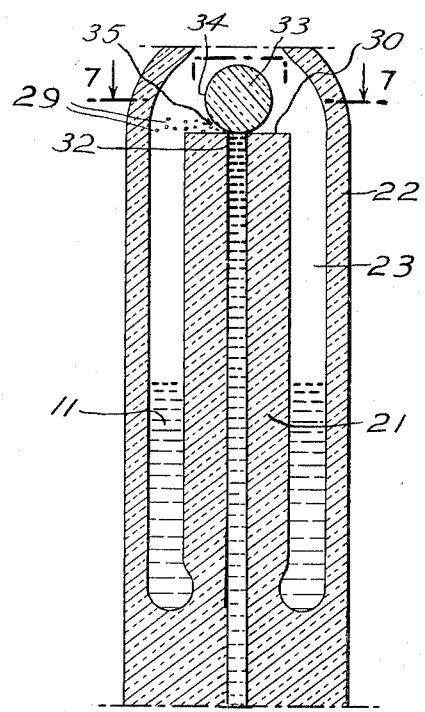
Fig. 6 represents a fragmentary enlarged section through a modified form of overflow spout and reservoir of the thermometer.
Figure 7:
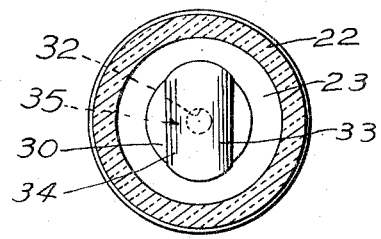
Fig. 7 represents a fragmentary section through the reservoir of Fig. 6 showing in full lines the modified spout of that figure.

The modified form of device shown in Figs. 6 and 7 is similar to everything so far described up to the provision of the spout 21. In the modification shown, the spout instead of being drawn out and curved upon itself as in the preferred form, is cut off at the upper end in a substantial plane 30, preferably, in the center of which the bore end 32 is located. A round transverse piece of glass tubing 33 is fused to the end of the spout on opposite sides of the bore end 32, and the rounded surface 34 is substantially tangential to the end 30 and to the bore 32 with which it may be symmetrical or asymmetrical depending upon the size of minute constricted opening 35 angularly divergent from the bore 32 that may be desired. Here again, any emission from the spout, even in the form of a single large globule in the normal course of operation will be so extruded under pressure as to be converted into a fine spray, in effect, of small globules which will be given such velocity as to pass either completely off the end of the spout into the reservoir or at least will be driven so far from the entrance that no danger of their reentry as separate globules exists.

Calibrating the thermometer is always done with reference to a selected low temperature, which would be such as to be readily available to operators and users of the thermometer in running tests of various heat conditions. Purely for purposes of illustration, although, incidentally, this is actually preferred, it is calibrated with reference to a pan or bowl of crushed or cracked ice. This, of course, represents a temperature of 32° F. or 0° C. Assuming further that the instant thermometer being calibrated is to take care of temperatures starting at 300° F. as a purely illustrative temperature which, of course, may be higher or lower than this point if desired, the thermometer will be subjected to a temperature of a known 300° F. This will cause the mercury or other fluid to expand with a consequent extrusion of the excess fluid volume through the upper restricted fine opening preferably laterally into the reservoir until the volume of mercury in the thermometer tube and bulb to the very end of the bore at 27 or 32, depending upon which form is used, is representative of or a function of 300° F. The thermometer is then held upright while the bulb thereof is immersed in the cracked ice and the temperature lowered in the bulb until the volume of mercury or other fluid in the tube has reached a point representative of shrinkage because of a temperature of 32° F., which, of course, represents a considerable drop in the level of the fluid in the bore away from the end thereof in the reservoir. The level thus reached is then marked as 300° F. Whenever thereafter the exposure of the bulb to an unknown maximum temperature is such as to push out or extrude excess mercury or fluid to a proportion such that following subsequent immersion of the bulb in cracked ice, the level of the mercury in the tube is coincident with the graduation marked 300° F., the marking of which has just been described, the maximum temperature thus registered will be a true 300° F. Similarly, the thermometer is next subjected to a known 400° F., which will result in the increased expansion of the mercury or fluid such that an extra amount will be extruded so that when the bulb is again immersed in ice, the level of the contracted fluid remaining in the bore between the bulb and the extreme tip end of the bore, in either form of the device, will be lower than before (for 300°) and this new level will be marked and graduated as 400° F. Again, at any time in the future that the thermometer is exposed to an unknown temperature such that after subsequent immersion in ice the fluid level is aligned with the graduation of 400°, the actual stored temperature indication will be an actual or true 400° F. This will be followed at each additional point of 100° higher until all of the more or less basic graduations have been made. Thereafter, the intermediate graduations will be filled in by averaging the distance between them, if desired, although it will be clear that where exceptional accuracy is desired, each graduation may be made by the method just outlined.

It will be evident that with the instant thermometer held upright after attainment of the desired maximum temperature, or so far as to preclude reentry of extruded fluid, the actually attained temperature can be determined at any time thereafter, and there is therefore an actual registration of the attained temperature. This is in marked contrast to the previous attempts at this result in which, in addition to the difficulties already enumerated, the thermometer functions on a fluid trap basis. This type utilizes a constriction or trap in the bore past which the fluid, such as mercury, was forced by expansion, in order to trap a certain amount above the constriction (thus registering the maximum temperature), which instrument is then reset or reconditioned by violent shaking, or swinging of the instrument. This is the principle of a fever thermometer and is probably relatively accurate for low temperatures. As soon, however, as the temperatures become even moderately high, it is found that expansion of the glass expands and opens the constriction or trap, and the weight of the mercury above the constriction after even the slightest decrease in temperature, permits or forces some or all of it to run down by gravity past the trap and the thermometer fails to give any accuracy whatever for the purpose of storing a maximum reading.

With the thermometer shown in use it will be exposed to the situation involving the particular temperature in question, which in the instant device, as noted, purely illustratively, may be from 300° F. to 900° F. As the temperature effective on the thermometer rises, either steadily, or in stages or spurts as it progressively increases, the mercury 11 expands and this increase in volume forces the excess mercury through the restricted passage 18 or 35 laterally of the bore and into the reservoir. When the maximum temperature is attained and the last globule of excess mercury will be squirted out transversely of the bore and thereafter so long only as the temperature remains constant on the thermometer the volume of mercury in the capillary and bulb to the spout end 27 or 32 will be constant. At this time at least the thermometer should be held upright with the bulb 10 at the bottom. At any time thereafter the slightest decrease of temperature will lower the level of mercury in the spout, which is one situation in which the difficulties of the past were encountered, as, despite the extrusion of the exact proportional amount required by the attained temperature, the adherent residual globule of the excess mercury clinging to the mouth of the spout, would be drawn back in, either on top of the column of mercury to change its apparent volume, or spaced therefrom by a globule of gas. With the instant invention, however, there is no such residual globule in position to be drawn in.

After exposure to the maximum temperature, the thermometer should be held upright and the bulb thereof immersed in something of known low temperature, such as a bowl of crushed ice at 32° F. or 0° C., with reference to which temperature the graduations of the device have been calibrated, which will therefore give the operator the correct maximum reading. If the device has been calibrated with reference to ice, as noted, and ice is not available to the operator using the instrument, then a pan of water of any known temperature, say, illustratively, of 72° F. or 40° above the temperature of ice, may be substituted. In this case, to the reading of the device with the bulb immersed in the water must be added 40°, in a negative sense, to secure the actual maximum temperature. Of course, if the bulb is immersed in something of known low temperature, lower than that of ice, in order to secure the maximum temperature reading, then the difference between this known low temperature and that of ice must be subtracted from the reading, in a positive sense, to obtain the true maximum temperature. The addition or subtraction is only relative because the readings of the thermometer are reversed, that is, the lower the mercury falls in the tube, the higher the maximum temperature that is thus indicated.

While there have been many attempts in the past to provide gas or air traps in the capillary line of thermometers, they have been only indifferently successful as the gas globule tends to remain in the line of the column of mercury as a permanent point of separation therein. The asymmetrical laterally developed and relatively thin trap 17 is very effective, as it is found that any gas trapped in the line, such as the globule 36, when it reaches the level of the trap, through capillary attraction tends to move laterally out of the line of the column in the bore 13 toward the lateral extremity 19 of the trap, which enables mercury to pass behind it to establish a solid column.

Figure 3:
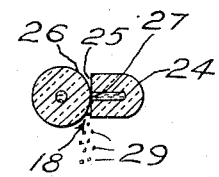
Fig. 3 represents a fragmentary section on line 3—3 of Fig. 2.
Figure 4:
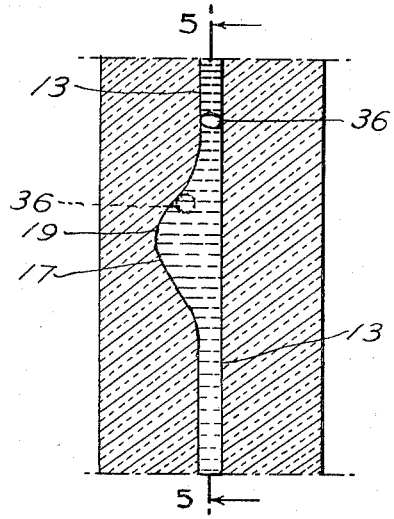
Fig. 4 represents a fragmentary longitudinal section transverse of the capillary tube showing the improved gas trap from one side, on line 4—4 of Fig. 5.
Figure 5:
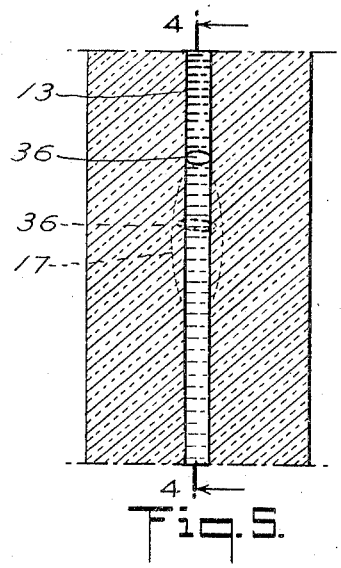
Fig. 5 represents a fragmentary lateral section through the capillary tube on line 5—5 of Fig. 4, showing the gas trap from one edge.

It will be understood that in reconditioning the thermometer it is simply necessary to heat the bulb again to raise the temperature past the last test temperature which will drive out any entrapped gas in the trap and establish a solid column from the bulb to the very end of the spout 25 or 30 in Fig. 6, after which, the thermometer is suddenly reversed to cause the mercury in the reservoir to surround and submerge the mouth 25 of the spout and to hold it submerged while the mercury in the capillary shrinks or contracts while the compressed gas contained in the reservoir effective on the surface of the mercury forces mercury in through the tiny lateral opening 18 or 35 of Figs. 3 and 6, respectively, to fill the column completely as the temperature of the whole is reduced toward that in the room in which the charging takes place. The necessity is for speed as the shrinkage of the mercury after great expansion is at a high rate, and if the mercury stops being injected for an interval in which the temperature is dropping, the gas in the reservoir enters the spout and must needs be caught in the gas trap 17. If the delay is too long, too great an amount of gas may enter and the whole recharging cycle may require to be repeated.

It is thought that the advantages and simplicity and accuracy of the invention will be understood, as will the fact that the temperatures given are purely illustrative, as temperatures in excess of 1500° are rendered available by the use of fused quartz or the like for the instrument.

Having thus described our invention, we claim:

1. A thermometer comprising a tube having a capillary bore, a sealed reservoir communicating with the bore, and means restricting the end of the bore to a passage appreciably smaller than the diameter of the bore to eject expelled fluid in small globules, having velocity sufficient to move the globules away from the entrance to the restricted passage, said means having a rounded surface and said passage being formed by the juxtaposition of the end of the capillary bore with said rounded surface.

2. A thermometer comprising a tube having a capillary bore, a sealed reservoir communicating with the bore, and means restricting the end of the bore to a passage appreciably smaller than the diameter of the bore to eject expelled fluid in small globules, having velocity sufficient to move the globules away from the entrance to the restricted passage, said means having a rounded surface and said passage being formed by the juxtaposition of the end of the capillary bore with said rounded surface, said rounded surface being a portion of the periphery of the tube.

3. A maximum temperature registering thermometer comprising a tube having a capillary bore, a bulb connected to the bore, mercury in the bore, a sealed housing on the end of the tube remote from the bulb containing gas under pressure, and forming with the tube a reservoir, a spout having a bore communicating with the bore of the tube disposed in the reservoir and terminating in spaced relation to the housing, means forming with the termination of the spout a restricted passage angularly divergent from said bore of said spout termination through which mercury is forced laterally into the reservoir in small drops with increase of temperature on the bulb.

4. A maximum temperature registering thermometer comprising a tube having a capillary bore, a bulb connected to the bore, mercury in the bore, a sealed housing on the end of the tube remote from the bulb containing gas under pressure and forming with the tube a reservoir, a spout having a bore communicating with the bore of the tube disposed in the reservoir and terminating in spaced relation to the housing, said spout being reentrantly bent upon itself so that the end of the spout substantially abuts the outer surface of the spout to form therebetween a restricted laterally directed passage through which mercury is extruded when the volume of mercury increases to a proper degree.

5. The method of calibrating a maximum temperature registering thermometer having an overflow gravitational discharge reservoir, which comprises exposing the thermometer to a known relatively high temperature to form a solid column of fluid in the bore to the overflow end thereof, terminating the column sharply at the overflow end, subjecting the thermometer to a known low temperature to cause the solid column to shrink without also drawing in any fluid which has passed beyond said sharp termination of said column, and marking the upper termination of the shrunken column with a graduation identified with the known relatively high temperature.

6. The method of calibrating a maximum temperature registering thermometer having an overflow gravitational discharge reservoir, which comprises exposing the thermometer to a known relatively high temperature to form a solid column of fluid in the bore to the overflow end thereof, terminating the column sharply at the overflow end, subjecting the thermometer to a known low temperature to cause the solid column to shrink without also drawing in any fluid which has passed beyond said sharp termination of said column, marking the upper termination of the shrunken column with a graduation identified with the known relatively high temperature, and subjecting the thermometer to a second known relatively high temperature different from the first, subjecting the thermometer to the said known low temperature to cause the column to shrink to a new level, and marking the upper termination of the column with a graduation identified with the said second mentioned high temperature.

7. A maximum registering thermometer comprising a tube having a capillary bore, a bulb attached to one end of the tube in communication with the capillary bore, an expansible fluid in the bulb, a sealed reservoir communicating with the bore and surrounding the other end of the tube, said tube having graduations using the end of the tube within the reservoir as a zero point for the calibrations and progressing toward a high point toward the bulb, means at the end of the tube at the zero point comprising an obstruction juxtaposed to the end of the tube in partial blocking relation to the bore therein for positively and inevitably causing fluid passing the end of the tube at the head of an expanded column leading from the bulb to pass out of the tube and gravitationally into the reservoir, the termination of the column of expansible fluid being always at the same exact sharply defined point relative to the end of the capillary bore of the tube, and said calibrations being such that following attainment of an unknown maximum temperature, the expansion of the fluid causes some unknown portion of fluid from the bore to be expanded into the reservoir and the residue in the bore and bulb shrinks under exposure to a predetermined relatively low temperature until the head of the shrunken column in the bore becomes aligned with a calibration comprising a function of the unknown temperature which established the solid column.

8. A registering thermometer comprising a tube defining a capillary bore and having an upper end and a terminal mouth, means defining a sealed reservoir enclosing said upper end of the tube in communication with the bore and having a reservoir portion vertically below the terminal mouth in the upright position of the thermometer, a bulb communicating with the tube, expansible fluid in the bulb, means in the reservoir forming with the terminal mouth a restricted passage through which excess fluid is expelled to gravitational deposition in the reservoir to effect a positive terminal end of fixed location for any solid column of fluid in the tube whenever under expansion some fluid has been expelled from the tube, said thermometer having a series of calibrations of decreasing magnitude extending from a point near the bulb to a point near the upper end of the tube, each calibration representing the secondary position of the positive terminal end of the column of fluid in shrinking from an expanded solid column in the tube with a given high temperature incident on the thermometer to a partial column in the tube with a predetermined lower temperature incident on the thermometer, the whole so arranged that after the attainment of an unknown maximum temperature the value thereof can be determined by exposing the thermometer to a lower temperature than such maximum temperature and of known relation to the low temperature by which the thermometer was calibrated, pursuant to which the secondary position of the terminal end of the shrunken column resulting can be correlated with the appropriate calibration of said series to determine the maximum temperature attained by the thermometer.

HUGO ENGELHARDT.
EDWARD COLLINS, III.

(References on following page)

REFERENCES CITED

The following references are of record in the file of this patent:

UNITED STATES PATENTS

| Number | Name | Date |
| --- | --- | --- |
| 1,945,434 | Greer | Jan. 30, 1934 |
| 2,320,753 | Schwartz | June 1, 1943 |

FOREIGN PATENTS

| Number | Country | Date |
| --- | --- | --- |
| 6,599 | Great Britain | Mar. 25, 1896 |
| 270,503 | Germany | Feb. 16, 1914 |
| 485,995 | France | Dec. 4, 1917 |